United States Patent Office 3,257,745
Patented June 28, 1966

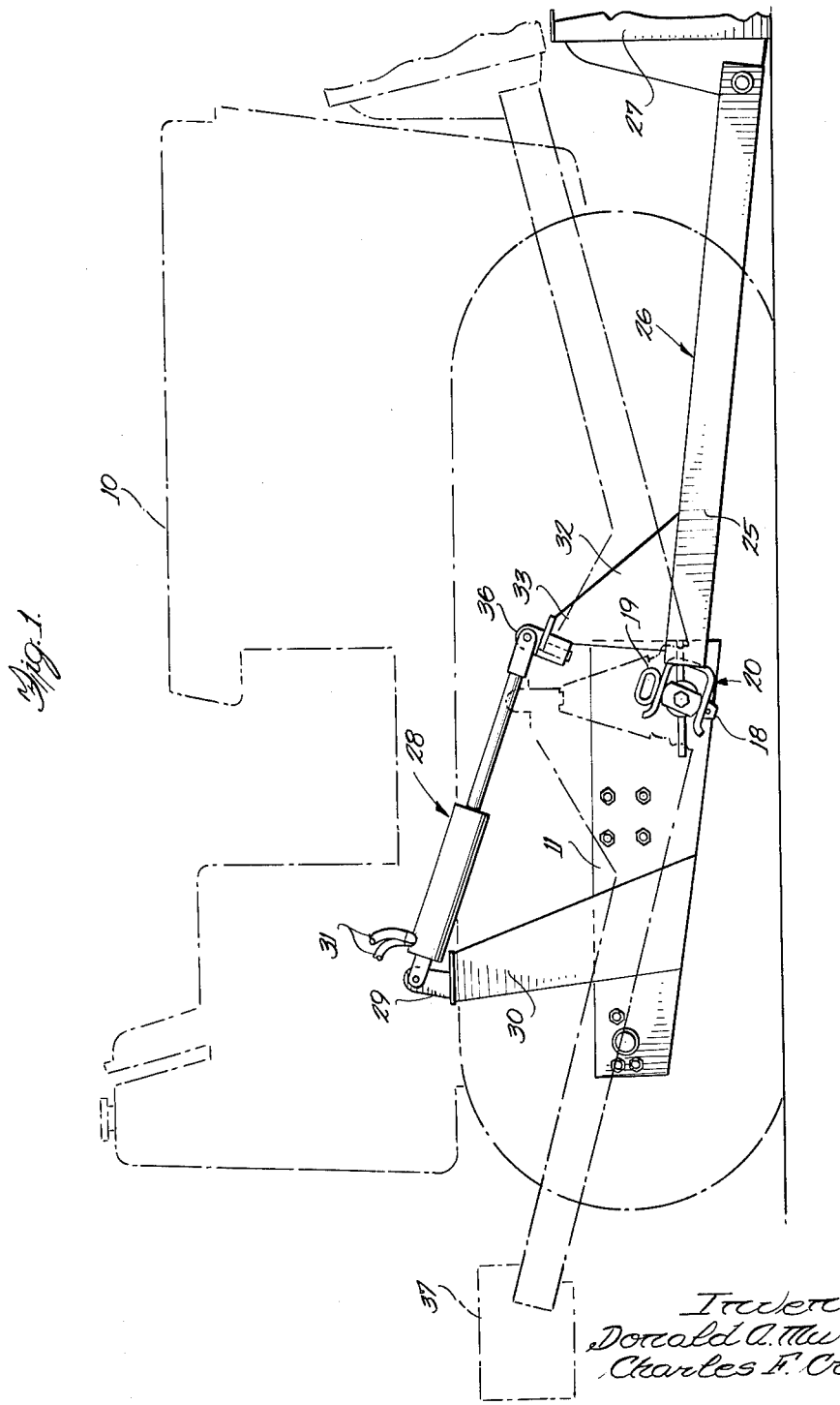

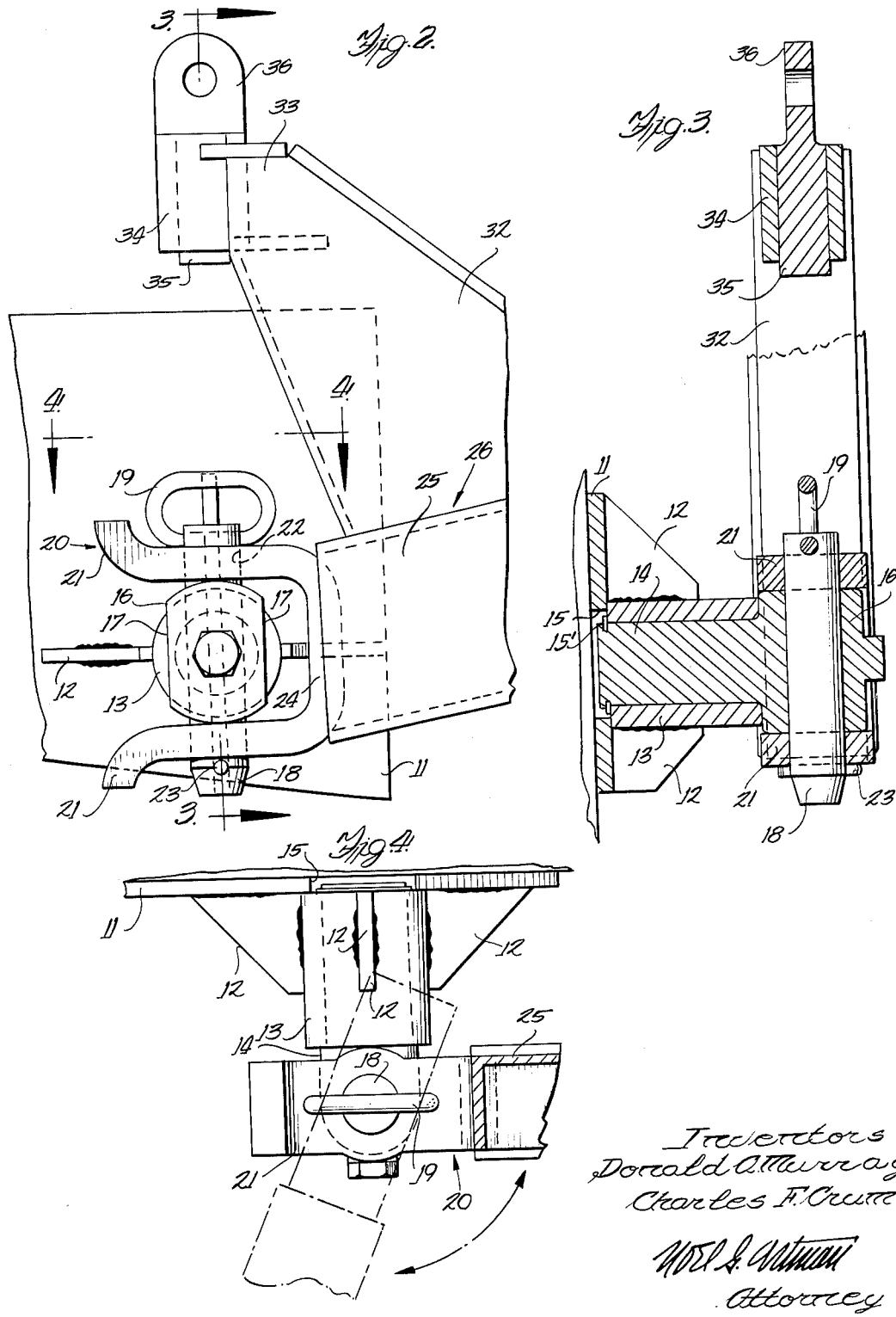

1

3,257,745
TRACTOR IMPLEMENT ARM REVERSING
APPARATUS
Donald A. Murray and Charles F. Crumb, Stockton, Calif., assignors to International Harvester Company, Chicago, Ill., a corporation of New Jersey
Filed Jan. 14, 1963, Ser. No. 251,182
7 Claims. (Cl. 37—144)

This invention relates to tractors, particularly of the crawler type. More specifically, the invention concerns implement-carrying arms for tractors wherein the arms can be reversed from front to rear for mounting of different kinds of implements thereon.

A tractor of the crawler type is adapted to perform difficult jobs requiring power and rugged performance, such as bulldozing, scarifying, deep plowing and cultivating and the like. The implement supporting arms for such a tractor are long and heavy and are usually connected at one end to the sides of a tractor to extend forwardly as for the mounting thereon of a bulldozer, or optionally rearwardly for the mounting thereon of a tool bar of the like to which other implements can be secured to be pulled by the tractor. In order that the height of the implement with respect to the ground may be adjusted and for transport, the connection of each arm to the tractor includes a transverse pivot accommodating vertical swinging of the implement-carrying arms in either of the operating positions thereof.

The implement arms are bulky and heavy, and to facilitate the reversal thereof by the operator from front to rear, or vice versa, it has been proposed to also provide in the connection of the arm to the tractor a generally vertical pivot by which one end of the arm can be supported during this operation. However, this has also been a difficult and dangerous maneuver for a tractor operator.

An object of the present invention is the provision of improved means for supporting and controlling the implement-carrying arms of a tractor.

Another object of the invention is the provision of improved means for mounting implement arms on a tractor to facilitate reversal thereof from one end of the tractor to the other for the purpose of optionally attaching front and rear operating implements thereto.

Another object of the invention is the provision of novel means for connecting power transmitting means on a tractor to the implement-carrying arms thereof to control the operation of the arms and to support them during horizontal swinging thereof from one end of the tractor to the other.

A further object of the invention is the provision of improved reversible implement arm mounting means for a tractor, wherein each implement arm is supported by a hydraulic ram or cylinder or the like during reversal of the arm and wherein the position of the cylinder is maintained substantially unchanged while the implement arm is swung horizontally relative thereto.

Other objects and advantages of the invention will become clear from the following detailed description when read in conjunction with the accompanying drawings, wherein:

FIGURE 1 is a view in side elevation showing schematically a crawler tractor having reversible implement arm mounting and control means thereon incorporating the features of this invention;

FIGURE 2 is an enlarged detail of a portion of the implement arm mounting means;

FIGURE 3 is a section taken on the line 3—3 of FIGURE 2, and

FIGURE 4 is a section taken on the line 4—4 of FIGURE 2.

In the drawings the numeral 10 designates a tractor of

2 the crawler type having the usual power plant and being provided at each side with an elongated mounting plate 11, only one of which is shown. Opposed pairs of triangularly shaped lugs 12 are affixed to plate 11 and straddle a sleeve member 13 to which they are affixed as by welding.

Rotatably mounted in sleeve 13 is a stub shaft or pivot member 14, the inner end of which is received in an opening 15 in plate 11 and is grooved to receive a collar 15' which is carried in a recess in the shaft and engages the end of sleeve 13 to lock the pivot member 14 against displacement laterally outwardly.

The outer end of stub shaft 14 has a broadened portion 16 having opposed flattened sides 17 and apertured to receive a vertically extending pivot pin 18 to the upper end of which is secured an oval shaped handle 19.

Pivot pin 18 also serves as a locking pin to secure to the enlarged portion 16 of horizontal pivot member 14, a clevis 20 having arms 21 straddling the enlarged portion 16 and provided with apertures 22 adapted to receive the ends of pin 18. Pin 18 is held against displacement from clevis 20 and pivot member 14 by a cotter key 23 and the handle 19. At this point it should be clear that clevis 20 is capable of rotating about the horizontal axis of pivot member 14 and horizontally about the vertical axis of pivot pin 18.

Clevis 20 has a bight portion 24 to which is affixed one end of a beam 25, forming with the clevis an implement-carrying arm 26 which extends horizontally along the side of the tractor. Although only one arm 26 is shown in the drawings, it may be understood that a duplicate arm 26 is also provided on the opposite side of the tractor.

In solid lines in FIGURE 1 arm 26 extends forwardly, and between the arms 26 on opposite sides of the tractor there is secured a transversely extending bulldozer blade 27, which may be of any conventional construction. Blade 27 is vertically swingable with arm 26 about the horizonal transverse axis of pivot member 14 between operating and non-operating positions as indicated in dotted lines in FIGURE 1, by the provision of a hydraulic cylinder 28 pivotally anchored at one end to a lug 29 affixed to the upper end of a bracket 30 secured to plate 11. Cylinder 28 is a double-acting hydraulic cylinder receiving fluid under pressure through hose lines 31 from a source of fluid pressure, not shown, provided on the tractor.

Each of the arms 26 on opposite sides of the tractor is provided with an upwardly projecting lever arm 32, triangularly shaped, and affixed at its base to the upper edge of arm 26 near the inner end thereof. An upper portion 33 of lever 32 overlies clevis 20 and pivot member 14, 16, and carries a sleeve section 34 which is apertured to receive a generally vertically extending pivot pin 35, coaxial with pin 18 and having a head 36 to which is pivotally connected the other end of hydraulic cylinder 28.

The hydraulic ram or cylinder 28 is double-acting to raise and lower the tool-carrying arm 26. In FIGURE 1 cylinder 28 is shown in its extended position with the bulldozer blade 27 in lowered or operating position. Upon retraction of the cylinder the implement is elevated to the dotted line position shown.

When it is desired to reverse the implement arm 26 and swing it horizontally from front to rear to support a rear mounted implement of a different kind, the bulldozer blade 27 is removed and arm 26 elevated by the retraction of cylinder 28 until pivot pin 35 is in generally vertical alignment with pivot pin 18, as indicated in dotted lines in FIGURE 1. In this position the arms 26 are supported by the cylinders 28 on opposite sides of the tractor and each arm is swingable about the aligned axes of pins 35 and 18 horizontally rearwardly to the dotted line position shown for the mounting of an implement carrier such as a tool bar 37 indicated in FIGURE 1. Swinging of the tool-carrying arm 26 horizontally from front to rear is thus accomplished while maintaining the position of cylinder 28 substantially unchanged and parallel to the plane of the tractor and of plate 11.

Cylinder 28 has not substantially changed its position, lever 32 has moved from the forward side of pivot pin 18 to the rear side thereof, and continued retraction of the cylinder lowers the tool bar 37 to an operating position. Raising of the tool bar 37 is therefore now accomplished by the extension stroke of the cylinder.

It is believed that the construction and operation of the improved reversible implement-carrying arms and the control means therefor will be clearly understood from the foregoing description. It should likewise be understood that the invention has been described in its preferred embodiment and that modifications may be made therein without departing from the spirit of the invention or the scope of the appended claims.

What is claimed is:

1. In a tractor having implement-carrying arms connected to the sides thereof adapted to extend optionally forwardly and rearwardly for the front and rear mounting of implements thereon, generally horizontal and vertical pivot means in the connection of each of said arms to the tractor accommodating both vertical movement of the arm between operating and transport positions of the implement and horizontal swinging thereof from front to rear, an extensible power transmitting member anchored at one end to the tractor, and means pivotally connecting the other end of said member to said arm on a generally vertical axis coaxial with the generally vertical pivot means connecting said arm to the tractor, whereby said arm is horizontally swingable relative to the tractor and to said member.

2. In a tractor having implement-carrying arms connected to the sides thereof adapted to extend optionally forwardly and rearwardly for the front and rear mounting of implements thereon, generally horizontal and vertical pivot means in the connection of each of said arms to the tractor accommodating both vertical movement of the arm between operating and transport positions of the implement and horizontal swinging thereof from front to rear, an extensible power transmitting member anchored at one end to the tractor, a part affixed to and projecting from said arm, a generally vertical pivot member carried by said part disposed coaxially with the generally vertical pivot means connecting said arm to the tractor, and means connecting the other end of said extensible member to said pivot member to support the arm while accommodating horizontal swinging of the arm relative to the extensible member from one end of the tractor to the other about the pivotal connection of the arm to the tractor and to said other end of the extensible member while maintaining the position of the extensible member relative to the tractor substantially unimpaired.

3. In a tractor having implement-carrying side arms connected at one end to the tractor on a horizontal axis for vertical movement between positions corresponding to operating and transport positions of the implement, wherein the connection of each said arm to the side of the tractor includes a generally vertical pivot accommodating swinging said arm horizontally from front to rear for the optional attachment thereto of front and rear mounted implements, the combination of a two-way hydraulic cylinder anchored at one end to the side of the tractor generally parallel thereto and at a location longitudinally removed from the pivotal connection of said arm to the tractor, a lever affixed to said arm, a pivot member mounted on the free end of said lever coaxially with said vertical pivot, and means pivotally connecting the other end of said cylinder to said pivot member to transmit force to the lever upon actuation of the cylinder, to vertically move said arm, said arm being horizontally swingable relative to the cylinder about the axes of said pivot member and said vertical pivotal connection of the arm to the tractor.

4. A hydraulic cylinder mount for a tractor provided with an implement-carrying side arm having a horizontal pivotal connection at one end to the tractor for swinging in a vertical plane between operating and raised positions and a generally vertical pivotal connection to the tractor for swinging the arm horizontally from front to rear of the tractor for optional mounting thereon of front and rear implements, comprising a hydraulic cylinder anchored at one end to the tractor and disposed in the plane of vertical movement of the side arm, and means connecting the other end of the cylinder to said arm for raising the arm upon the retraction stroke of the cylinder, said connection of the cylinder to the arm including generally vertical pivot means coaxial with said generally vertical pivotal connection of the arm to the tractor to accommodate horizontal reversal of the arm from one end of the tractor to the other, said cylinder, upon reversal of said arm, being effective in the reversed position of the arm to raise the latter upon the extension stroke of the cylinder.

5. In a tractor having implement-carrying arms pivoted to the side thereof for vertical swinging between operating and raised positions and for horizontal swinging from one end of the tractor to the other for the optional attachment thereto of front and rear mounted implements, means supporting the arm from the tractor throughout its range of horizontal swinging, comprising a lever affixed to the arm, a hydraulic cylinder anchored at one end to the tractor by a horizontal pivot for substantially vertical movement and positioned in a substantially horizontal plane generally parallel to the tractor, means pivotally connecting the other end of the cylinder to the lever on a generally vertical axis to hold the arm in a selected position in said vertical plane and to support the arm during horizontal swinging thereof while maintaining said position of the cylinder substantially unimpaired.

6. The invention set forth in claim 5, wherein said lever has a portion overlying the pivotal connection of the arm to the tractor accommodating said horizontal swinging thereof, and said overlying portion carries a pivoted member coaxial with said pivotal connection, whereby the arm and the lever swing horizontally relative to the cylinder.

7. In a tractor having implement-carrying arms pivoted to the sides thereof for vertical swinging between operating and raised positions and for horizontal swinging from one end of the tractor to the other for the optional attachment thereto of front and rear mounted implements, means supporting each arm from the tractor throughout its range of horizontal swinging, comprising a lever affixed to the arm, an extensible and retractable adjusting member pivotally connected at one end to the tractor and positioned in a vertical plane generally parallel to the tractor, means pivotally connecting the other end of said adjusting member to the lever on a generally vertical axis to hold the arm in a selected position in said vertical plane and to support the arm during horizontal swinging thereof while maintaing said position of the adjusting member substantially unchanged.

References Cited by the Examiner

UNITED STATES PATENTS

| 1,818,750 | 8/1931 | Protzeller | 37—105 |
| 2,314,475 | 3/1943 | Bird et al. | 37—144 |
| 2,764,824 | 10/1956 | Kepner | 37—144 |

FOREIGN PATENTS 480,653   5/1953   Italy.

ABRAHAM G. STONE, *Primary Examiner.*

BENJAMIN BENDETT, A. RUEGG, *Examiners.*

T. GRAHAM CRAVER, W. B. STONE, J. O. BOLT,
*Assistant Examiners.*